June 5, 1923.
H. N. HAYFORD
1,457,837
WORK CONTROLLING ATTACHMENT FOR LATHES
Filed May 13, 1920
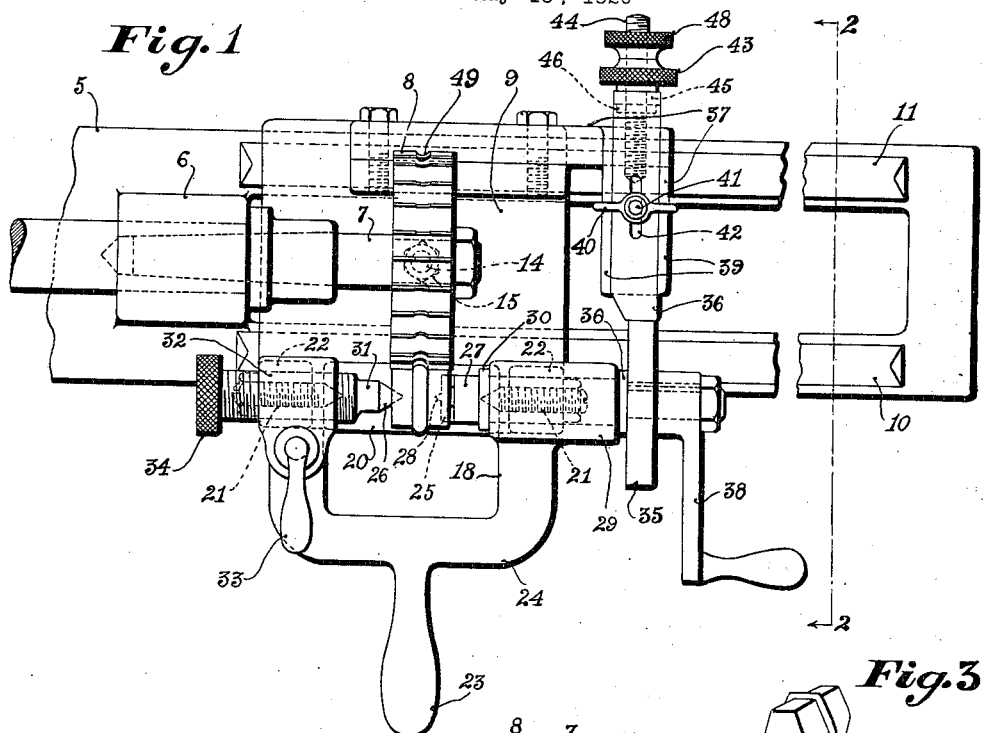
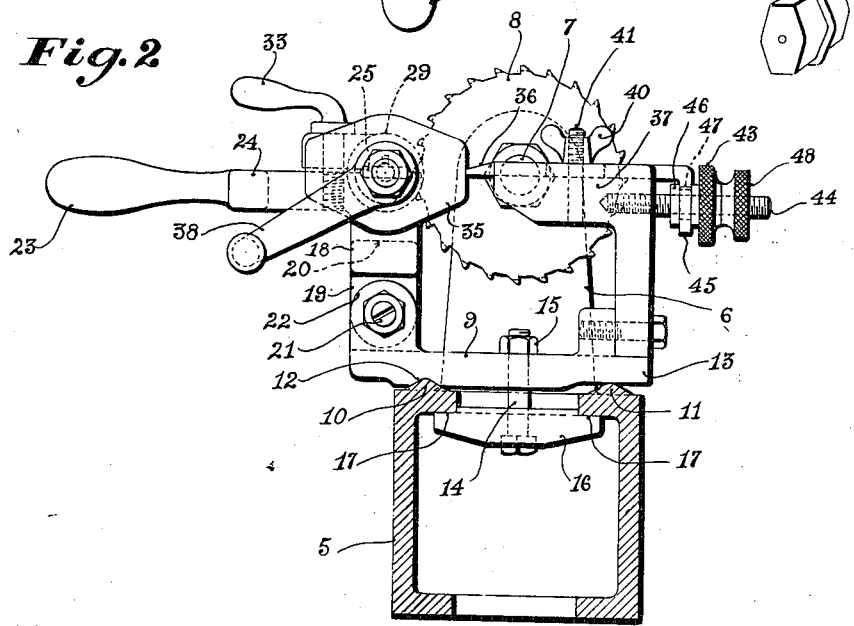
Witness
B. L. Baker.
Inventor
Harry N. Hayford
by his attorneys
Van Everen, Fish & Hildreth Patented June 5, 1923.

1,457,837

UNITED STATES PATENT OFFICE.

HARRY N. HAYFORD, OF CONCORD, NEW HAMPSHIRE, ASSIGNOR TO WILLIAM B. DURGIN COMPANY, OF CONCORD, NEW HAMPSHIRE, A CORPORATION OF NEW HAMPSHIRE.

WORK-CONTROLLING ATTACHMENT FOR LATHES.

Application filed May 13, 1920. Serial No. 380,999.

*To all whom it may concern:*

Be it known that I, HARRY N. HAYFORD, a citizen of the United States, residing at Concord, in the county of Merrimack and State of New Hampshire, have invented certain new and useful Improvements in Work-Controlling Attachments for Lathes; and I do hereby declare the following to be a full, clear, and exact description of the invention, such as will enable others skilled in the art to which it appertains to make and use the same.

The present invention relates to improvements in lathes and more particularly to a work-controlling attachment for the same by means of which an ordinary lathe may be rendered capable of turning irregular articles or articles of non-circular cross-sectional form.

The object of the invention is to provide a simple, compact and reliable attachment for lathes which will accomplish the above result and which may be readily applied to any usual form of lathe without any change in the mechanism of the lathe.

To this end the invention comprises the features of construction and combinations of parts hereinafter described and particularly pointed out in the appended claims.

In the accompanying drawings, illustrating what is now considered the preferred embodiment of the present invention, Figure 1 is a top plan view showing the attachment secured to the bed of a lathe and supporting a finished article in operative relation to a rotary cutter on the live spindle of the lathe; Fig. 2 is a section on the line 2—2 of Fig. 1; and Fig. 3 is a perspective view of an article turned on a lathe equipped with the present attachment.

As shown in the drawings, the bed of an ordinary lathe is indicated at 5, the head stock at 6, and the live spindle at 7. A rotary cutter 8 is secured to the inner end of the spindle 7. The various parts of the attachment embodying the present invention are carried upon a base-plate 9 which is adapted to rest and slide upon the usual V-shaped longitudinal guide-ribs 10 and 11 of the lathe-bed, a suitable groove 12 being formed in the underside of the base-plate 9 to receive one of the ribs, while a flat bearing face 13 is provided thereon to engage the other rib. Supported beneath the base-plate 9, by means of a bolt 14 and a nut 15, is a strap 16 which is adapted to engage bearing faces 17, such as are usually formed on the underside of the lathe bed. When the nut 15 is tightened, the strap 16 is clamped against the bearing faces 17 and securely fastens the base-plate 9 to the lathe-bed.

The stock to be operated upon is held in operative relation to the rotary cutter 8 by means of a U-shaped work-holding frame 18 which is mounted on the base-plate 9 for swinging movement in a vertical plane toward and from the cutter. To this end a lug 19 projects from the cross-bar 20 of the supporting frame and is pivotally mounted between the cone-shaped inner ends of two pivot screws 21 which are threaded through upstanding ears 22 on the base-plate 9. Extending forwardly from the work-holding frame 18 is a handle 23 by means of which the frame may be swung toward and from the cutter 8, the handle being connected with the opposite arms of the frame, near their upper ends, by a yoke 24. The work is held in position during the cutting operation, between a dog 25 and a center 26 which are formed on two spindles 27 and 31, respectively, that are carried by the work-holding frame. The work-supporting spindles 27 and 31 are maintained in parallelism with the axis of the rotary cutter 8 by means of the groove 12 in the base-plate 9, the groove 12 engaging with one of the guide-ribs 10 or 11 on the lathe-bed.

The dog 25 is of a well-known type comprising a wedge-shaped driving rib which extends diametrically across the inner end of the rotatable spindle 27 and is adapted to engage a correspondingly shaped recess in one end face of the work. The dog 25 serves also as a center, having a conical axial projection 28 which extends beyond the driving rib and is adapted to enter a conical recess in said end face of the work. The spindle 27 is journaled in a bearing sleeve 29 that is formed at the upper end of the right-hand arm of the work-holding frame 18. Longitudinal movement of the spindle 27 in the bearing 29 is prevented by means of collars 30 which engage opposite ends of the bearing.

The center 26 cooperates with the projection 28 on the dog 25 to center the work in axial alinement with the spindle 27. To this end the center 26 comprises a conical projection formed at the inner end of the spindle 31 which is mounted in the left hand arm of the work-holding frame 18 in axial alinement with the spindle 27 and which is longitudinally adjustable toward and from the dog 25. To this end the spindle 31 is screw-threaded into a split sleeve 32 that is formed integrally with the work-holding frame. The split sleeve 32 is adapted to be contracted by a hand screw 33 so as to securely clamp the spindle 31 in adjusted position. By loosening the screw 33 and turning the spindle 31 by means of a knurled head 34 at its outer end, the spindle may be adjusted to bring the center 26 into supporting engagement with the work or to withdraw the center from the work.

After the stock, which is being operated upon, has been positioned between the dog 25 and the center 26, the work-holding frame 18 is lifted by means of the handle 23, so as to swing the work against the revolving cutter 8 which, as shown in Fig. 1, is slightly wider than the length of the stock to be operated upon. The swinging movement of the frame 18 is limited by the engagement of a pattern wheel 35 with a templet 36 which is secured to a bracket 37 that is bolted to the base-plate 9.

The cross-sectional shape of the article to be produced is determined by the shape of the pattern wheel 35. To this end the spindle 27, carrying the pattern wheel, is adapted to be turned in the bearing 29 by means of a crank 38 which is secured to the outer end of the spindle 27, adjacent the pattern wheel 35. The crank 38 is turned by the operator with one hand, while with the other upward pressure is exerted upon the handle 23 so that during the cutting operation the periphery of the pattern wheel is held continuously against the templet 36. As the pattern wheel is turned, the common axis of the wheel and the work is moved toward and from the templet 36 by reason of the non-circular peripheral contour of the pattern wheel, and the work is consequently moved to a corresponding extent toward and from the cutter. Thus, after the spindle has been turned through a complete revolution, the cross-sectional contour of the article produced by the cutting operation corresponds exactly to that of the pattern.

In order that similarly shaped articles of various sizes may be produced without the necessity of employing different sized pattern wheels, the templet 36 is mounted between a pair of parallel guide ribs 39, on the top of the bracket 37, for longitudinal sliding movement toward and from the pattern wheel, so that the templet may be adjusted relatively to the pattern wheel, and provision is made for securing the templet in adjusted position. In the construction shown, the templet is rigidly secured to the bracket 37 by means of a winged clamping nut 40 on a stud 41 which rises from the bracket 37 and projects through a longitudinal slot 42 in the templet.

To permit the templet 36 to be accurately adjusted, a knurled adjusting nut 43 is provided on a screw-threaded stud 44, which projects rearwardly from the bracket 37, the stud extending through a slotted down-turned extension 45 at the rear end of the templet. On the forward side of the adjusting nut 43 is formed a hub 46 which extends through the slotted extension 45 and is provided with an annular groove 47, the opposite side walls of which overlap the adjacent portions of the templet on either side thereof. By turning the adjusting nut 43, the templet may be moved longitudinally and adjusted accurately with relation to the pattern. A lock-nut 48, on the stud 44, serves to bind the nut 43 in adjusted position. After the templet has been adjusted, the clamp nut 40 is tightened, clamping the templet 36 to the bracket 37 and thus relieving the adjusting nut 43 of the thrust of the pattern wheel as the latter is rotated by the crank 38 while pressed rearwardly against the templet.

When a rotary cutter of the ordinary type is employed, the cutting blades of which have straight axially disposed edges, the surfaces formed by the cutter upon the work will be parallel throughout their length to the longitudinal axis of the work. Surfaces variously curved or shaped in an axial direction may be produced, however, without varying the cross-sectional contour of the article, by employing cutters having differently shaped cutting edges.

The above described attachment is particularly useful for turning heat insulators such as are interposed between the handle and body of tea or coffee pots, or other articles of hollow ware. Articles of this sort are formed with an annular rib, such as indicated in Fig. 3. This rib may be turned by employing, in the lathe, cutter blades which have curved cutting portions, such as indicated at 49, in Fig. 1.

The present attachment may be applied to any lathe of usual construction, without machining operations of any change whatsoever in the mechanism of the lathe, by merely adjusting the strap 16 and tightening the nut 15. By loosening the nut 15, the base plate 9 may be readily adjusted on the lathe-bed to bring the work into position to be operated upon by the cutter. By means of this attachment an ordinary lathe may be readily converted into a machine for turning irregular forms, or forms of symmetrical but non-circular cross-sectional shape. By varying the shape of the cutting edges of the cutter used on the lathe in connection with the attachment, the shape of the lateral surface of the work, as viewed from the side, may be modified without changing the cross-sectional shape thereof. In this way, the article produced may be curved or shaped in both transverse and longitudinal directions by a single operation, at a considerable saving of time and expense. By varying the adjustment of the templet 36, a lathe to which the present attachment is applied, may be adapted to turn different sized articles of similar shapes, without the necessity of changing the size of pattern wheel.

While it is preferred to employ the specific construction and arrangement of parts shown and described, it will be understood that this construction is not essential, except so far as specified in the claims and may be changed or modified without departing from the broader features of the invention.

The invention having been described, what is claimed is:—

1. A work-controlling attachment for use on a lathe provided with a rotary cutter having, in combination, a pattern wheel, a fixed templet with which the pattern wheel is adapted to cooperate to determine the shape imparted by the cutter to the work, means for rotatably supporting in fixed relation to each other the work and the pattern wheel constructed and arranged to permit manual movement of the work and the pattern wheel into and out of engagement with the cutter and the templet, respectively, and means for rotating the work and the pattern wheel while they are engaged by the cutter and templet, respectively.

2. A work-controlling attachment for use on a lathe provided with a rotary cutter having, in combination, a pattern wheel, a fixed templet with which the pattern wheel is adapted to cooperate to determine the shape imparted by the cutter to the work, means for rotatably supporting in fixed relation to each other the work and the pattern wheel constructed and arranged to permit them to be manually swung into and out of engagement with the cutter and the templet, respectively, means for rotating the work and the pattern wheel while they are engaged by the cutter and templet respectively, and means for adjusting the templet to vary the position of the axis of the work relatively to the cutter and thus vary the size of the article produced by the cutting operation.

3. A work-controlling attachment for use on a lathe provided with a rotary cutter having, in combination, a base-plate adapted to be removably secured to the lathe-bed, a work-holding frame pivotally mounted on the base-plate and adapted to be swung toward and from the cutter, a handle for swinging the frame, a fixed center on the frame for supporting one end of the work, a spindle rotatably mounted in the frame for supporting the other end of the work and for rotating the same, a pattern wheel rigidly mounted upon the spindle for determining the shape of the article produced by the cutting operation, a fixed templet adapted to be engaged by the periphery of the pattern wheel when the frame is moved toward the cutter, and a handle for rotating the spindle to turn the work while the pattern wheel and templet control its movement toward and from the cutter.

4. A work-controlling attachment for use on a lathe provided with a rotary cutter having, in combination, a base-plate adapted to be removably secured to the lathe-bed, a work-holding frame mounted on the base-plate and adapted to be moved toward and from the cutter, means on the frame for rotatably supporting in fixed relation to each other a piece of stock to be operated upon by the cutter and a pattern wheel for determining the shape of the article produced by the cuttting operation, a bracket secured to said base-plate, a templet mounted on said bracket with provision for longitudinal sliding movement and adapted to present its forward end to the periphery of the pattern wheel, a screw-threaded stud projecting from said bracket, and an adjusting nut on the templet, the stud and nut being so constructed and arranged that by turning the nut the templet may be adjusted toward and from the pattern wheel.

5. A work-holding attachment for use on a lathe provided with a rotary cutter having, in combination, a base-plate adapted to be secured to the lathe-bed, and provided with a pair of upstanding ears and with a bracket, a U-shaped work-holding frame pivotally mounted on the arms of the base-plate for swinging movement toward and from the cutter, a handle on the frame for swinging the frame, a rotatable spindle journaled in said frame and provided at one end with a work-engaging dog, a longitudinally adjustable spindle mounted in said frame in axial alinement with the rotatable spindle having at one end thereof a work-engaging center adapted to cooperate with said dog to support the work, a pattern wheel secured to the rotatable spindle for determining the shape of the article produced by the cutting operation, a templet adjustably mounted upon the bracket of the base-plate and adapted to be engaged by the pattern wheel when the frame is swung toward the cutter, and a crank secured to the rotatable spindle for turning the work and the pattern wheel.

6. A work-controlling attachment for use on a lathe provided with a rotary cutter having, in combination, a pattern wheel; a fixed templet with which the pattern wheel is adapted to cooperate to determine the shape imparted by the cutter to the work; means for rotatably supporting in fixed relation to each other the work and the pattern wheel, said means comprising a fixed spindle terminating in a center for engaging one end of the work and a rotatable spindle carrying the pattern wheel and terminating in a dog for engaging the opposite end of the work; a work-holding frame in which said spindles are mounted the frame being adapted for swinging movements toward and from the rotary cutter; a base-plate upon which the work-holding frame is pivotally mounted, said base-plate adapted to be removably secured to the lathe-bed and having a groove therein adapted to cooperate with means on the lathe-bed to maintain the work-supporting spindles in parallel relation with the axis of the rotary cutter; a handle for swinging the work-supporting frame; and a handle for rotating the spindle carrying the pattern wheel.

7. A machine for turning heat insulators for the handles of hollow ware having, in combination, a rotary cutter provided with blades having substantially straight end portions and an intermediate concave portion, means for rotating the cutter, a work-supporting frame movable toward and from the cutter and carrying a center and a spindle for rotatably supporting the work, a pattern wheel carried by the spindle and corresponding in shape to the cross-sectional outline of the handle of the hollow ware, a normally fixed templet to be engaged by the pattern wheel, means for adjusting the templet to vary the size of the insulator, and a handle for rotating the spindle.

8. In an apparatus for turning articles of non-circular cross-sectional form, the combination with a revolving cutter having an irregular cutting edge adapted to engage the lateral surface of the work simultaneously throughout the length of the latter, of means for rotatably supporting the work and turning it about a longitudinal axis as it is being operated upon by the cutter constructed and arranged to permit its axis to be manually moved toward and from the cutter in accordance with a pattern as it is being turned.

9. The method of turning irregular articles which comprises performing cutting operations upon a piece of stock simultaneously throughout its length to produce an irregular lateral surface thereon, revolving the stock about a longitudinal axis while said cutting operation continues, and manually moving the article laterally within the field of said cutting operations while it is being revolved, to impart a non-circular cross-sectional contour thereto.

10. A work-controlling attachment for use on a lathe provided with a rotary cutter having, in combination, a pattern wheel, a fixed templet with which the pattern wheel cooperates, and means for pivotally supporting the pattern wheel and work arranged to permit rotation of the work and pattern wheel with relation to the cutter and to permit the work and pattern wheel to be swung into and out of engagement with the cutter and templet respectively.

11. A work-holding attachment for use on a lathe provided with a rotary cutter having, in combination, a U-shaped work-holding frame, means for holding the work in the frame consisting of a fixed center and a rotatable spindle, a pattern wheel mounted upon the rotatable spindle, means for pivotally mounting the frame with respect to the cutter, a fixed templet with which the pattern wheel is adapted to cooperate to determine the shape of the work, and a handle on the frame for manually moving the work and the pattern wheel into and out of engagement with the cutter and the templet, respectively.

HARRY N. HAYFORD.